United States Patent [19]
Olson, Jr. et al.

[11] Patent Number: 5,596,813
[45] Date of Patent: Jan. 28, 1997

[54] MEASURING INSTRUMENT WITH DIAMOND COATED CONTACTS

[75] Inventors: Eric E. Olson, Jr., Bolton; Bela G. Nagy, Acton, both of Mass.

[73] Assignee: Saint Gobain/Norton Industrial Ceramics Corp., Worcester, Mass.

[21] Appl. No.: 298,255

[22] Filed: Aug. 30, 1994

[51] Int. Cl.$^6$ ............................ G01B 3/18; G01B 3/20
[52] U.S. Cl. ........................ 33/816; 33/783; 33/831; 33/DIG. 11
[58] Field of Search .................. 33/816, 831, DIG. 11, 33/806, 810, 784, 783

[56] References Cited

U.S. PATENT DOCUMENTS

| | | | |
|---|---|---|---|
| 2,376,118 | 5/1945 | Brown | 33/DIG. 11 |
| 3,987,552 | 10/1976 | Raiteri | 33/555.1 |
| 4,621,656 | 9/1986 | Suzuki et al. | 33/784 |
| 5,029,402 | 7/1991 | Lazecki et al. | 33/784 |
| 5,351,125 | 9/1994 | Karanian et al. | 33/DIG. 4 |

FOREIGN PATENT DOCUMENTS

| | | | |
|---|---|---|---|
| 109801 | 6/1984 | Japan | 33/816 |
| 1531004 | 11/1978 | United Kingdom | 33/816 |

Primary Examiner—Christopher W. Fulton
Attorney, Agent, or Firm—Volker R. Ulbrich; David Gordon

[57] ABSTRACT

Precision measuring instruments having highly parallel and wear-resistant contact members and a method for fabricating these contact areas are disclosed. The measuring instruments preferably include two contact members each having diamond coated ceramic substrates. The method for diamond coating the contact members of the measuring instruments includes, for each contact member, preparing a ceramic substrate to high tolerance so that it has two surfaces which are parallel within 0.25 microns, diamond coating one surface of the substrate by any one of several chemical vapor deposition (CVD) techniques, and metalizing the other surface of the substrate for affixing it to the contact member of the measuring instrument. The metalized surface of the substrate is preferably affixed to the contact members of the measuring instrument by brazing, gluing or welding. Preferred embodiments of the measuring instruments with diamond coated contact areas include calipers and micrometers. The provided measuring instruments can be used to measure extremely abrasive materials such as sandpaper and grinding wheels without suffering any appreciable wear to their contact surfaces over a long period of time.

19 Claims, 3 Drawing Sheets

MEASURING INSTRUMENT WITH DIAMOND COATED CONTACTS

BACKGROUND OF THE INVENTION

1. Field of the Invention

This invention relates broadly to measuring instruments. More particularly, this invention relates to highly accurate measuring instruments having diamond coated contacts and to a method of applying the diamond coating to the contacts.

2. State of the Art

As the science of metrology becomes more precise and exacting, the need for dependable and consistent measuring instruments has become essential. Measuring instruments such as micrometers and calipers have highly parallel contact surfaces which may be subject to considerable wear, particularly if they are used to measure highly abrasive materials, such as sandpaper, grinding wheels, etc. Such wear may cause irregularities on the contact surfaces which decalibrate the instrument and yield incorrect and inconsistent measurements. Thus, where the precision of a measurement is crucial, it may be necessary to recondition the contact surfaces to make them smooth and parallel and to recalibrate the measuring instrument. Such a procedure, however, in addition to being costly, removes the instrument from use for the period of time necessary to machine it and to recalibrate it. Although the irregularities in the contacts of a measuring instrument may be too small to be noticed by a user, who may then fail to recalibrate the instrument, these irregularities may still significantly affect the precision of its measurements, and cause finished parts to be measured inaccurately.

In order to minimize the wear on the above discussed measuring instrument contacts, it is known in the art to provide a layer of hard material, such as tungsten carbide, at the contact surfaces. Tungsten carbide, however, is still subject to frequent wear and decalibration when the instrument is used to measure abrasive materials which are harder than tungsten carbide and/or chemically active with its cobalt binder. It is therefore desirable to use a harder, chemically inert, and more wear resistant material as a contact surface. The hardest known material is diamond. The hardness of diamond combined with its low coefficient of friction would make it ideal for use as a contact surface in measuring instruments. However, there is no apparent way to apply a diamond surface to the contacts of a measuring instrument. While it might be possible to braze diamond pads to the contact surfaces of a micrometer, this would present several significant problems. First, the contact surfaces of a micrometer must be perpendicular to the shaft, and parallel to each other, within ten one-millionths of an inch at every point. This would require the diamond pads to be almost perfectly parallel relative to each other and perpendicular relative to the shaft. The hardness of diamond makes it difficult to cut and grind to this required accuracy. Also, the cost of a diamond pad is prohibitive because the pad must be fabricated from a larger diamond and machined at great expense to this required tolerance of parallel sides.

SUMMARY OF THE INVENTION

It is therefore an object of the invention to provide measuring instruments having extremely hard and wear resistant contacts.

It is also an object of the invention to provide measuring instruments having hard and wear resistant contacts which are easily fabricated by the tool manufacturer.

It is another object of the invention to provide measuring instruments having diamond coated contacts.

It is also an object of the invention to provide a method of coating the contact surfaces of a measuring instrument with diamond.

In accordance with the objects of the invention, which will be discussed in detail below, a ceramic substrate having two opposed surfaces is prepared to a high tolerance. The ceramic substrate, which may be, for example, silicon nitride, tungsten carbide, or another formable strong ceramic, is shaped so that it has a substantially constant thickness to within 0.25 microns. One surface of the substrate is then coated with a diamond layer approximately ten microns thick by any one of several chemical vapor deposition (CVD) techniques. The other surface is metalized and affixed to one of contacts of a measuring instrument by gluing, brazing, or welding. A second substrate is then prepared in a similar fashion to the first, and affixed to the other contact of the measuring instrument.

According to the invention, a measuring instrument is provided which broadly includes at least one contact having a ceramic substrate. One side of the ceramic substrate is partially coated by any one of several chemical vapor deposition (CVD) techniques with a thin diamond layer of about ten microns thickness. The other side of the substrate is metalized and affixed to a contact area of the measuring instrument by brazing, gluing or welding.

Several measuring instruments utilizing the diamond coated ceramic substrate of the invention are provided. A first such instrument is a digital micrometer which generally includes a substantially C-shaped frame, an anvil, a spindle, a spindle adjuster, and an electronic measuring device. The C-shaped frame has two arms which are substantially parallel and form a jaw therebetween. The cylindrical anvil has a flat, generally circular, contact portion. The anvil is affixed to the end of one of the arms of the frame such that the surface of the contact portion of the anvil is perpendicular to the arm and faces into the jaw. The spindle is axially adjustable and is aligned with the anvil. The adjustable spindle has a flat contact portion which is similar in size and shape to the contact portion of the anvil and is arranged to be parallel to the contact portion of the anvil. The spindle has an axially rotatable handle for adjusting the spindle, and an electronic measuring device is coupled to the spindle in a manner known in the art so that it can measure the distance between the contact surfaces of the anvil and the spindle. In accord with the preferred embodiment of the invention, each of the spindle and anvil contact portions further includes a disk formed from silicon nitride or another suitable substrate, with the disk having two flat surfaces. Prior to attaching the disk to the contact portions of the spindle and anvil, the surface of each disk is metalized to promote adhesion to the spindle and anvil contact portions such as by gluing or brazing; and the other surface of the disk is CVD diamond coated and forms the outer contact surface of the spindle and anvil once the disk is affixed to the spindle and anvil.

Another measuring instrument utilizing the invention is a digital caliper which generally includes a track having a perpendicular fixed first outside measuring jaw with a contact edge portion, an adjustable second outside measuring jaw having a contact edge portion and parallel to the first outside jaw, a fixed inside measuring jaw and an adjustable inside measuring jaw, and an electronic measuring device adjustably disposed along the track. The adjustable outside measuring jaw and adjustable inside measuring jaw are adjusted by rotating an adjusting wheel on the electronic measuring device. Each of the first outside measuring jaw and the second outside measuring jaw contact edge portions further includes a strip formed from silicon nitride or another suitable substrate, with the strip having two flat surfaces with a width equal to that of the outside measuring jaws. Prior to attaching the strips to the jaws, one surface of each strip is metalized to promote adhesion to the first and second outside measuring jaws such as by gluing or brazing; and the other surface of the strip is CVD diamond coated so as form the contact edges of both measuring jaws. In an alternative embodiment of the calipers, the ceramic substrate strip may have the same length as the measuring jaws, with only a diamond coated end portion of the strip forming the actual contact edge.

Additional objects and advantages of the invention will become apparent to those skilled in the art upon reference to the detailed description taken in conjunction with the provided figures.

DETAILED DESCRIPTION OF THE PREFERRED EMBODIMENT

Figure 1:
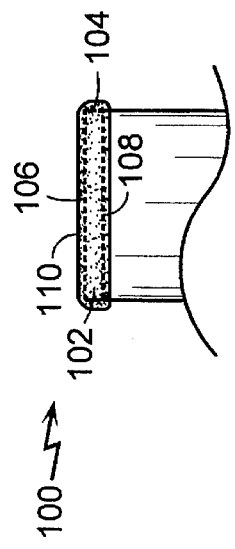
FIG. 1 is a detailed view of a diamond coated silicon nitride disk prepared according to the invention for attachment to the anvil and spindle of a micrometer.

Turning now to FIG. 1, a detailed view of a diamond coated anvil or spindle contact pad 100 for a micrometer (further illustrated and described with reference to FIG. 2) is shown. The contact pad 100 preferably includes a silicon nitride disk 102 having an edge 104 and having a first surface 106 and an opposite second surface 108. The disk 102 is machined or otherwise prepared so that the first surface 106 and the second surface 108 are parallel to each other within 0.25 microns (approximately ten one-millionths of an inch). The disk 102 preferably has a diameter substantially equal to that of the anvil and the spindle of the micrometer to which it is to be applied. A diamond layer 110 having a preferred thickness of about ten microns is coated on the first surface 106 of the disk 102 and preferably over the edge 104 of the disk 102 by any known CVD technique such as disclosed for example in Weimer, W. A. et al., "Examination of the Chemistry Involved in Microwave Plasma Assisted Chemical Vapor Deposition of Diamond", *J. Mater. Res.*, Vol. 6, No. 10 (Oct. 1991); Bachmann, P. K. et al., "Towards a General Concept of Diamond Chemical Vapour Deposition", *Diamond and Related Materials*, Elsevier Science Publishers (1991, pp. 1–12); and Japanese Laid-Open Patent Application No. 4-272179. The second surface 108 of the disk 102 is metalized and affixed to the anvil or spindle of the micrometer by gluing, brazing, welding, or any other suitable technique. In accord with the invention, the disk 102 may be made of ceramic compounds other than silicon nitride, such as silicon carbide or tungsten carbide, provided the ceramic compound can be properly coated with a diamond layer and is sufficiently strong to act as a contact. Preferably, the disk 102 is not so hard as to be difficult to machine or prepare to the required parallel tolerance, and is also not so expensive that preparation of the disk is cost prohibitive.

Figure 2:
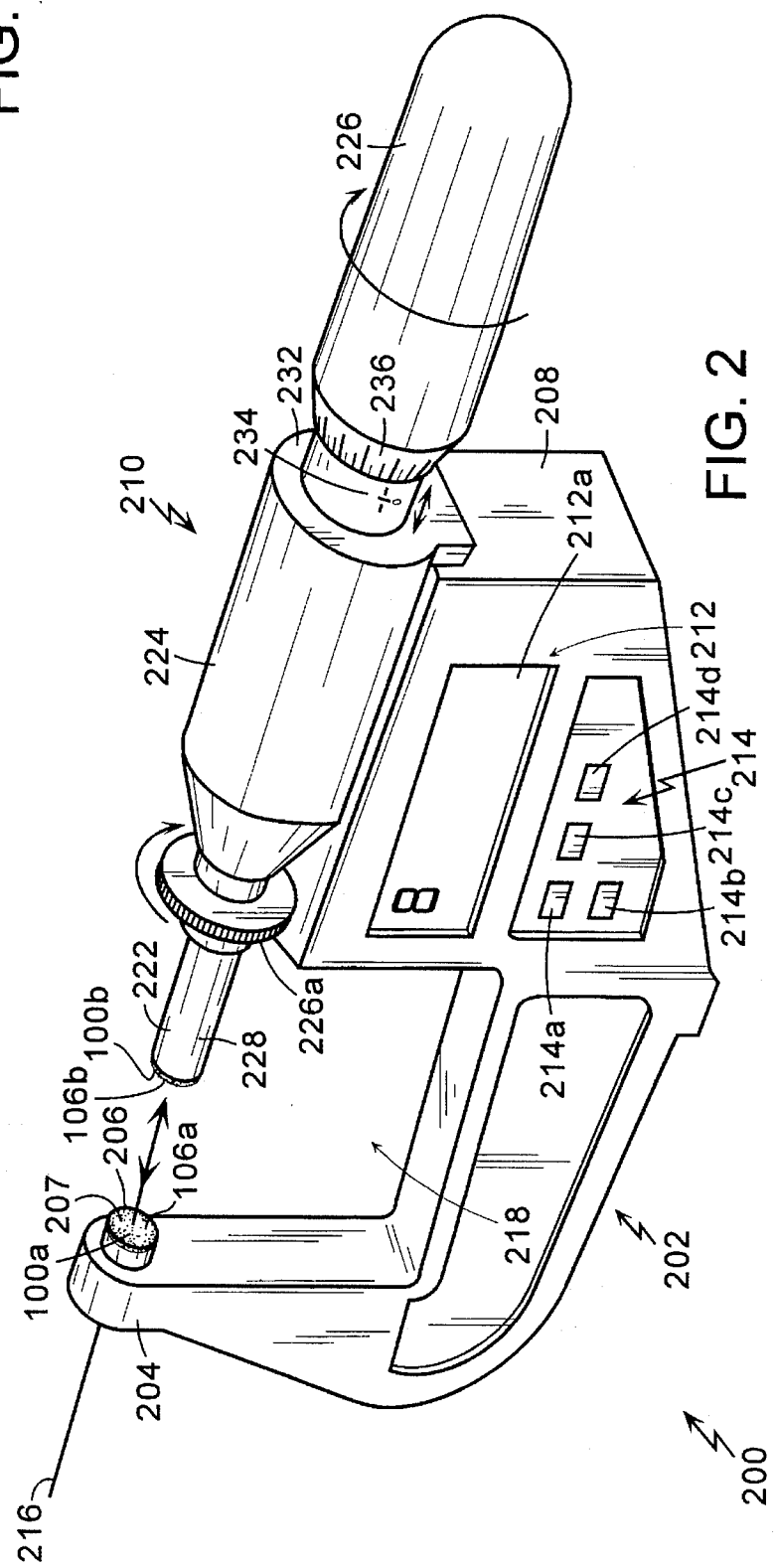
FIG. 2 is a perspective view of a micrometer having a diamond coated anvil contact surface and the diamond coated spindle contact surface according to the invention.

Referring now to FIG. 2, a first exemplary embodiment of a measuring instrument 200 according to the invention is shown. The measuring instrument 200, known as a digital micrometer, includes a substantially C-shaped frame 202 with a first arm 204 to which a cylindrical anvil 206 is affixed, and a second arm 208 which contains the spindle mechanism 210, an electronics package (not shown) coupled to the spindle mechanism 210 in a manner known in the art, a digital LCD readout 212 coupled to the electronics package, and an electronic keypad 214 coupled to the electronics package. The anvil 206 is substantially perpendicular to the first arm 204 and has an axis 216 facing into the jaw 218 formed by the first and second arms 204 and 208 of the C-frame 202. The anvil further includes a surface 207 which is substantially perpendicular to the axis 216 of the anvil 206. A ceramic disk 100a having a diamond coated contact surface 106a, such as shown and described above with reference to FIG. 1, is attached to the surface 207 of the anvil 206 with the diamond coated contact surface 106a exposed. The spindle mechanism includes an axially adjustable cylindrical spindle 222, a spindle housing 224 in which the spindle 222 is movably engaged, a spindle adjuster 226, and a precision adjuster 226a. The spindle 222 has a first end 228 parallel to and facing the anvil surface 207, and a second end 232 rotatably engaged to the spindle adjuster 226, such that when the spindle adjuster 226 is rotated, the spindle 222 moves linearly along the axis 216 of the anvil 206. A ceramic disk 100b having a diamond coated contact surface 106b, such as shown and described above with reference to FIG. 1, is attached to the first end 228 of the spindle 222 so that the contact surface 106b faces the contact surface 106a. The second end 232 of the spindle 222 and the spindle adjuster 226 both contain measuring indicia 234,236. The precision adjuster 226a is a circular grooved disk that can be rotated to achieve smaller increments in spindle movement than that achieved by the spindle adjuster 226.

It will be appreciated that during measurement of an object, when the spindle 222 is moved relative to the anvil 206 to grasp the object therebetween, the electronics package measures the movement of the spindle 222 relative to the anvil 206 and provides an indication of the distance between the anvil and the spindle. It will also be appreciated that the electronics package will be calibrated to indicate the distance between the facing surfaces 106a, 106b of the anvil and spindle disks 100a, 100b. The distance is displayed on an LCD screen 212a of the digital readout 212. The associated keypad 214 which includes on/off keys 214a, 214b, a mode key 214c which selects the units of measurement, and a hold key 214d which saves any recorded measurement is used in manners known in the art. With the provided arrangement, the diamond coated disks 100a, 100b provide a precise, substantially wear-resistant contact surface for the digital micrometer.

Figure 3:
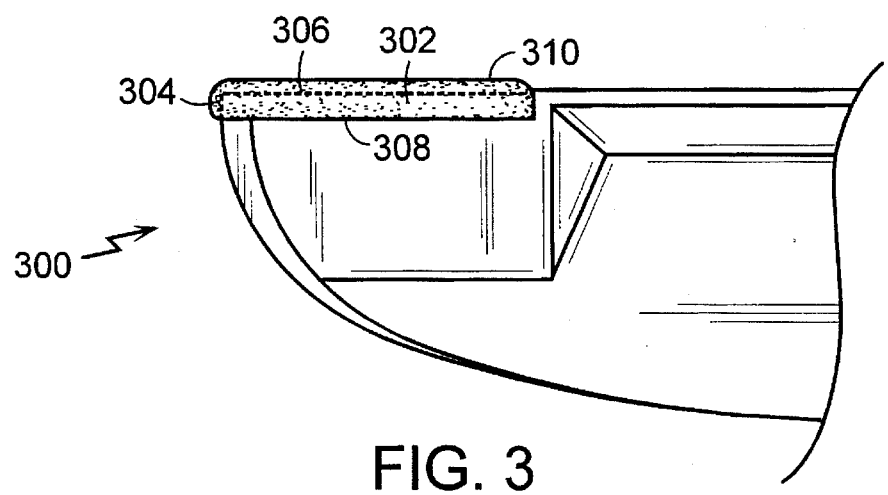
FIG. 3 is a detailed view of a diamond coated silicon nitride strip prepared according to the invention for attachment to the contact edges of a measuring jaw of a calipers.

Turning now to FIG. 3, a detailed view of a diamond coated contact edge 300 for the measuring jaw of a calipers is shown. The contact edge 300 includes a silicon nitride rectangular strip 302. The strip 302 has a side edge 304, and also includes a first surface 306 opposite and parallel a second surface 308. The strip is prepared so that its surfaces 306 and 308 are parallel to each other within 0.25 microns. A diamond layer 310 having a preferred thickness of about ten microns is coated on the first surface 306 of the strip and preferably over the edge 304 by any known CVD technique. The second surface 308 of the strip 302 is metalized for affixation to the first and second outside measuring jaws of a calipers by brazing, gluing, welding, or any other suitable technique. In accord with the invention, the strip 302 may be made of ceramic compounds other than silicon nitride, such as silicon carbide or tungsten carbide, provided the ceramic compound can be properly coated with a diamond layer and is sufficiently strong to act as a contact edge.

Figure 4:
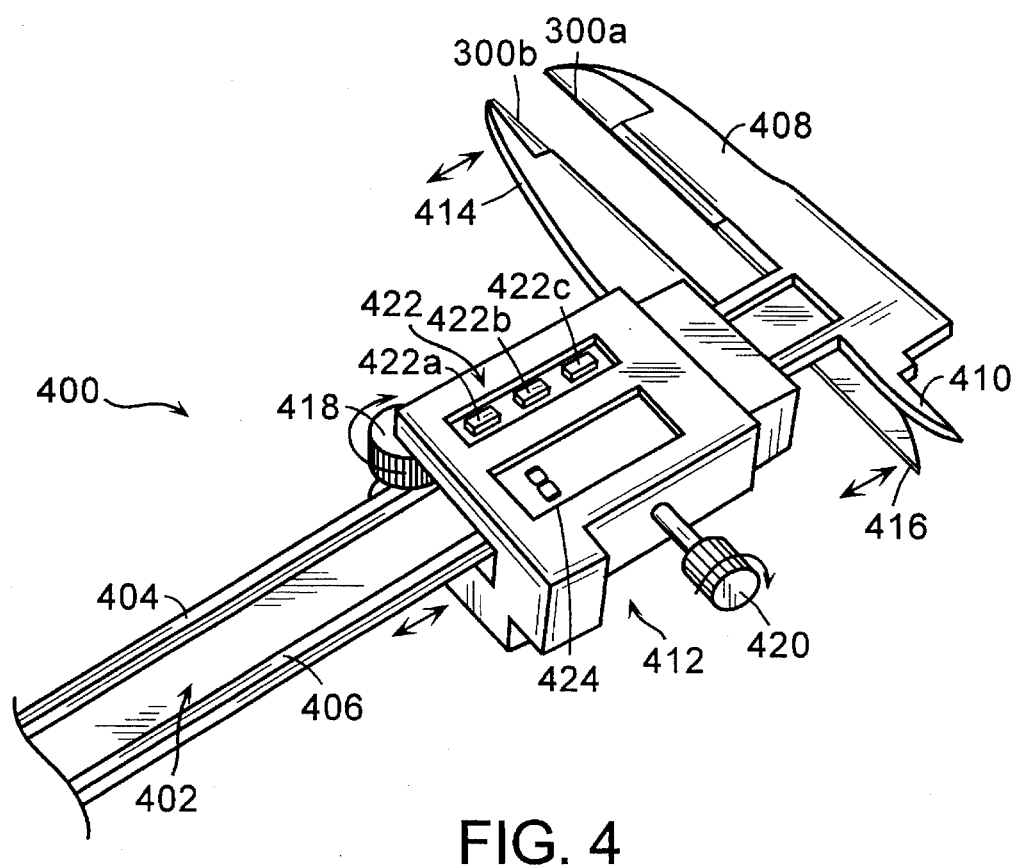
FIG. 4 is a perspective view of a calipers having diamond coated outside measuring jaw contact edges according to the invention.

Referring to FIG. 4, a second exemplary embodiment of a measuring instrument 400 is shown. The measuring instrument 400, a precision calipers, includes a track 402 having first and second edges 404, 406, a fixed first outside measuring jaw 408 perpendicular to the edges 404, 406 of the track 402, a fixed first inside measuring jaw 410 perpendicular to the edges 404, 406 of track 402, and a measuring unit 412 adjustably disposed along the track 402. Attached to the measuring unit 412 is an adjustable second outside measuring jaw 414 which is parallel to and faces the first outside jaw 408 and an adjustable second inside measuring jaw 416 parallel to and facing the first inside jaw 410. The measuring unit 412 also includes a rotating adjusting wheel 418, a rotating precision knob 420, an electronics package (not shown) and an electronic keypad 422 with LCD digital readout 424 which are coupled to the electronics package. In accord with the invention, the first outside measuring jaw 408 and the adjustable second outside measuring jaw 414 are provided with respective diamond contact edges 300a, 300b such as the kind described above with reference to FIG. 3.

When the adjusting wheel 418 is rotated, the measuring unit 412 moves along the track 402 along with the adjustable second outside measuring jaw 414 having the diamond contact edge 300b and the adjustable second inside measuring jaw 416. The precision knob 420 moves the measuring unit 424 along the track 402 in smaller increments than the adjusting wheel 418. Several keys 422a, 422b, 422c are available on the electronic keypad 422 for selecting the units of measurement and performing measurement related operations. The LCD digital readout displays data recorded by the measuring unit 412 and entered on the keypad 422. With the provided arrangement, the diamond contacts 300a, 300b provide a precise, substantially wear-resistant gripping or contact surface for the digital calipers.

Figure 5:
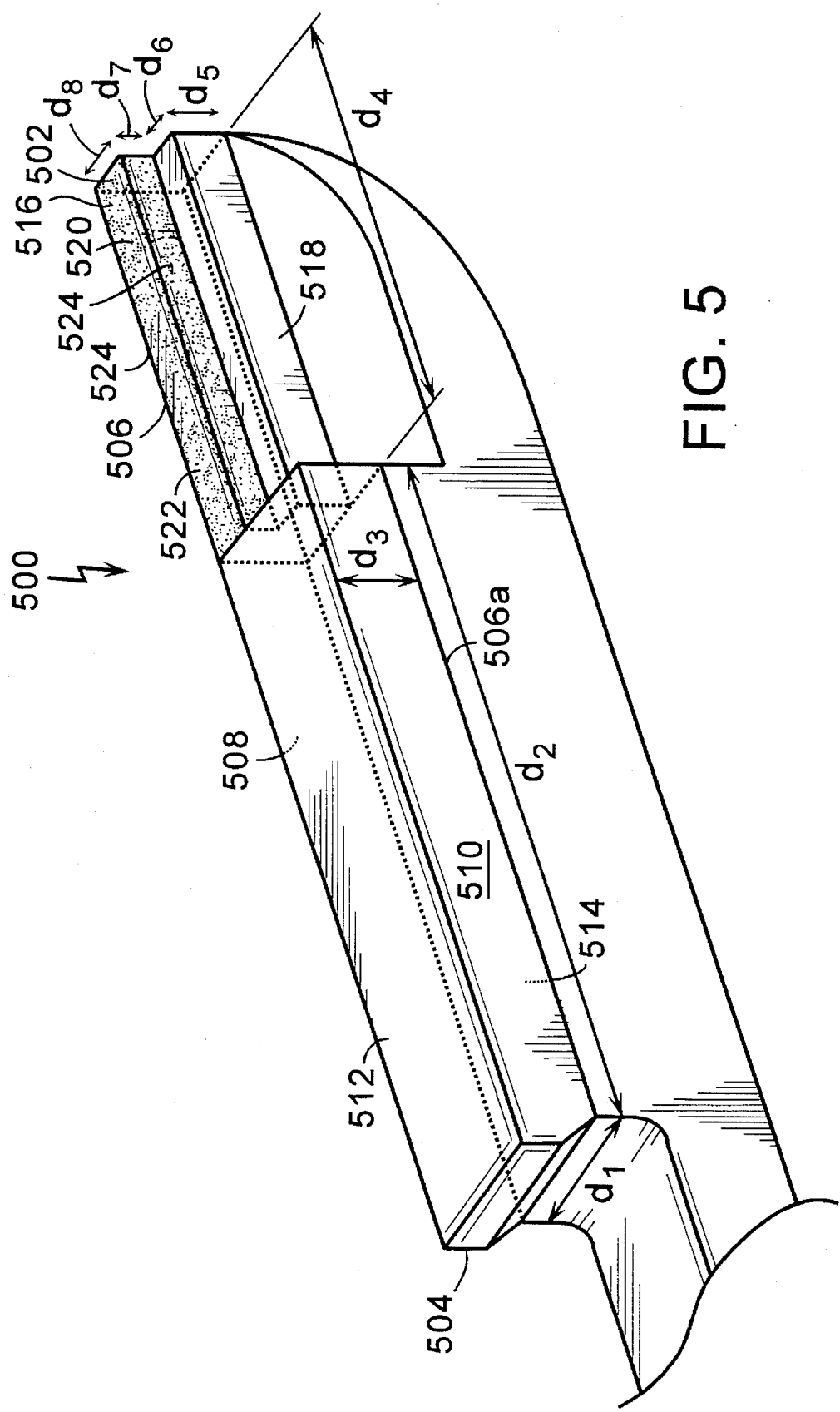
FIG. 5 is a perspective view of the contact edge portion of a second embodiment of a calipers.

Turning now to FIG. 5, a detailed view of an alternative embodiment of a diamond coated contact edge 502 for the outside measuring jaw 500 of a calipers is shown. The contact edge 502 is formed by a portion 506 of one end of a tungsten carbide rectangular jaw liner strip 504. The jaw liner strip 504 generally has an outside edge 508, an inside edge 510, and a first surface 512 opposite and parallel a second surface 514. The surfaces 512 and 514 are prepared such that they are parallel to each other within 0.25 microns. Portion 506 of the strip 502 is generally step shaped with a lower step 518, and an upper step 516 having an upper tread 522 and a riser 524. The upper step 516 is preferably smaller in width than the lower step 518 and provides the contact edge of the outside measuring jaw 500 for the calipers. The preferred dimensions (in inches) of the jaw liner strip 504 are listed below with minor tolerances not listed:

| d1 | (strip width): | 0.135 | d2 | (uncovered strip length): | 0.760 |
| d3 | (strip height): | 0.060 | d4 | (tread length): | 0.440 |
| d5 | (lower step height): | 0.040 | d6 | (lower tread width): | 0.025 |
| d7 | (riser height): | 0.020 | d8 | (upper tread width): | 0.040 |

A free standing CVD diamond layer 520 having a preferred thickness of about ten microns is fitted and vacuum brazed on at least the upper tread 522 and the riser 524 of the upper step 516, although it may also cover at least a portion of an outer edge 524a of step 516 as well. The free standing diamond layer 520 is manufactured by diamond coating a carrier substrate with any known CVD technique and then removing the carrier substrate. The resulting free standing diamond is then cut to the appropriate dimensions before being affixed to the upper step 516.

In affixing the diamond layer 520 to the upper step 516 by vacuum brazing, it is desirable that the surface of the diamond be coplanar with the surface 512 of the remaining portion of the liner strip 504. Three different techniques can be utilized to accomplish this. In a first technique, after the diamond is coated on the upper step 516, the diamond layer 520 on the upper step surface 522 is slightly higher than the liner strip surface 512, which is preferably a hard ceramic such as tungsten carbide. The diamond layer 520 is then finished to make it coplanar with the tungsten carbide surface 512 of the rest of the jaw liner strip 504. In a second technique, after the diamond layer 520 is coated on the upper step 516, the tungsten carbide surface 512 is higher than the diamond surface. Thus, the tungsten carbide surface 512 is finished so as to be coplanar with the diamond layer. This second technique may be preferable to the first technique in light of the hardness of diamond as compared to that of tungsten carbide. A third alternative technique is to guarantee that the thickness of the brazing material (not shown) used to affix the diamond layer 520 is such that the diamond layer 520 coating will be flush and coplanar with the tungsten carbide surface 512 once affixed to the upper step 516 of the first end 506.

Regardless of the technique utilized to guarantee that the diamond is coplanar with the remainder of the tungsten carbide surface 512, the second surface 514 of the strip 504 is metalized for affixation to the outside measuring jaw 500. The strip 504 may be affixed to the measuring jaw 500 by gluing, such as with a cyanoacrylate glue, or by brazing, welding, or any other suitable technique. In accord with the invention, the strip 504 may be made of ceramic compounds other than tungsten carbide, such as silicon carbide or silicon nitride, provided the ceramic compound can be properly coated with a diamond layer and is sufficiently strong to act as a contact edge.

According to a first method of the invention, a diamond coated contact is made by first shaping a silicon nitride or other suitable substrate so that it has a first surface and an opposite second surface which are parallel to each other within 0.25 microns. The substrate is preferably sized and shaped (e.g., circular, rectangular, etc.) to fit the contact surface of a measuring instrument. A diamond layer is then coated on the first surface of the substrate to a preferred thickness of about ten microns by using any one of several known chemical vapor deposition processes (CVD). The second surface is then metalized before being affixed by gluing, brazing, welding, or any other suitable technique to the measuring instrument. The same diamond coating and metalizing process is repeated with another ceramic substrate to provide a second contact for the measuring instrument. If desired, one or more edge surfaces of the ceramic substrate may also be coated with diamond via a CVD process.

According to the second method of the invention, a diamond layer is similarly CVD coated but onto a removable substrate. Once coated, the substrate is removed, leaving a free standing diamond layer. This free standing diamond layer is vacuum brazed onto a first surface of a ceramic strip. The second surface of the ceramic strip is then metallized and affixed to the measuring instrument by any technique described in the first method of the invention.

There have been described and illustrated herein several embodiments of a measuring instrument having diamond coated contacts and a method of diamond coating the contacts of these measuring instruments. While particular embodiments of the invention have been described, it is not intended that the invention be limited thereto, as it is intended that the invention be as broad in scope as the art will allow and that the specification be read likewise. Thus, while particular measuring instruments with the diamond coated contact surfaces such as micrometers and calipers have been disclosed, it will be appreciated that other measuring instruments could have diamond contacts as well. Furthermore while particular types of ceramic substrates such as silicon nitride, silicon carbide and (cemented) tungsten carbide have been disclosed, it will be understood that any suitable substrate can be used. For example, and not by way of limitation, other ceramics such as zirconia alumina, and alumina, and hard metals such as tungsten can be used provided they can be formed to a parallel surface and can be diamond coated by a diamond layering process. Also, while a ten micron thick diamond layer coating on the entire exposed ceramic substrate is preferred, it will be recognized that the diamond layer may be of other desired thicknesses (e.g., one micron or more) and that the substrate may be only partially coated. Moreover, while particular configurations have been disclosed in reference to the dimensions and shape of the ceramic substrate, it will be appreciated that other configurations could be used as well. Furthermore, while a CVD process has been disclosed for coating the surface contacts, it will be understood that any diamond layer manufacturing method can be similarly used. It will therefore be appreciated by those skilled in the art that yet other modifications could be made to the provided invention without deviating from its spirit and scope as so claimed.

We claim:

1. A measuring instrument for measuring an object, comprising:

first and second opposed contact members with respective first and second contact faces, at least said first contact member having an end portion comprising a hard substrate fixed to said contact member and coated with a diamond film coating on at least a portion of an exposed surface of said hard substrate to form said first contact face.

2. A measuring instrument according to claim 1, wherein:

said hard substrate is a first ceramic substrate, wherein said first ceramic substrate is coated with said diamond film coating.

3. A measuring instrument according to claim 2, wherein:

said first ceramic substrate is a material selected from the group consisting of silicon nitride, silicon carbide, tungsten carbide, zirconia alumina, and alumina.

4. A measuring instrument according to claim 2, wherein:

said measuring device is a micrometer having a fixed anvil having said first opposed contact member, a spindle having said second opposed contact member, said second opposed contact member being adjustable relative to said first opposed contact member.

5. A measuring instrument according to claim 4, wherein:

said ceramic substrate is of a substantially constant thickness which varies at most by 0.25 microns.

6. A measuring instrument according to claim 5, wherein:

said diamond film coating is at least substantially ten microns thick.

7. A measuring instrument according to claim 2, wherein:

said second contact member has an end portion comprising a second hard substrate fixed to said second contact member and coated with a diamond film coating on at least a portion of an exposed surface of said second hard substrate to form said second contact face.

8. A measuring instrument according to claim 7, wherein:

said measuring device is a micrometer having a fixed anvil having said first contact member, a spindle having said second contact member, said second contact member being adjustable relative to said first contact member.

9. A measuring instrument according to claim 8, wherein:

said first ceramic substrate is of a substantially constant thickness which varies at most by 0.25 microns, and said second ceramic substrate is of a substantially constant thickness which varies at most by 0.25 microns, and said first diamond film coating is at least substantially ten microns thick, and said second diamond film coating is at least substantially ten microns thick.

10. A measuring instrument according to 2, wherein:

said measuring device is a calipers having a first outside measuring jaw having said first contact member and a second outside measuring jaw having said second contact member, said second contact member being adjustable relative to said first contact member.

11. A measuring instrument according to claim 10, wherein:

said first ceramic substrate is of a substantially constant thickness which varies at most by 0.25 microns.

12. A measuring instrument according to claim 11, wherein:

said diamond film coating is at least substantially ten microns thick.

13. A measuring instrument according to claim 7, wherein:

said measuring device is a calipers having a first outside measuring jaw having said first contact member and a second outside measuring jaw having said second contact member, said second contact member being adjustable relative to said first contact member.

14. A measuring instrument according to claim 13, wherein:

said first ceramic substrate is of a substantially constant thickness which varies at most by 0.25 microns, and said second ceramic substrate is of a substantially constant thickness which varies at most by 0.25 microns, and said first diamond film coating is at least substantially ten microns thick, and said second diamond film coating is at least substantially ten microns thick.

15. A measuring instrument for measuring an object, comprising:

first and second opposed contact members with respective first and second contact faces, at least said first contact member having a hard substrate fixed to said contact member, said hard substrate having a main portion and an end portion with a diamond film coating on at least a portion of said end portion, said diamond film coating being substantially coplanar with said main portion of said hard substrate, said diamond film coating forming at least a portion of said first contact face.

16. A measuring instrument according to claim 15, wherein:

said end portion of said hard substrate is stepped, with a top step having a tread and a riser, said tread and said riser having said diamond film coating thereon, wherein said tread is substantially coplanar with said main portion of said hard substrate.

17. A measuring instrument according to claim 16, wherein:

said main portion of said hard substrate has a first width, and said tread of said top step has a second width smaller than said first width.

18. A measuring instrument according to claim 15, wherein:

said diamond film coating is at least substantially ten microns thick.

19. A measuring instrument according to claim 16, wherein:

said diamond film coating is a free standing diamond layer which is brazed to at least said tread, and said hard substrate is metallized and affixed to said first contact member.

* * * * *